Patented June 21, 1932

1,863,818

UNITED STATES PATENT OFFICE

DANIEL E. WELTS, OF PASADENA, CALIFORNIA

METHOD OF TOUGHENING SHEEP CASINGS

No Drawing.  Application filed July 1, 1931. Serial No. 548,260.

My invention relates to a method of toughening sheep casings that are generally used as the jackets or containers of various chopped or ground meat products, for instance, sausages, bologna, salame, liverwurst, weinerwurst, Frankfurters and the like and the principal object of my invention is, to provide a relatively simple and easily practiced method whereby sheep casings may be, in a comparatively short time and with comparatively little labor, rendered sufficiently tough and of the proper color to meet the requirements of the packers of ground or chopped meat products and further, to provide a method or process of the character referred to, that may be practiced economically and which advantageous result is attained due to the fact that no special equipment is required and the cost of materials used is comparatively small.

In practicing my improved method, casings that have been cleaned in the usual manner by machinery or other methods, are placed in a vat or container that is filled or partially filled with liquid composed of practically pure water, to which sufficient iodine is added to produce an amber color. After the water has been thus colored, a sufficient amount of anhydrous or aqua ammonia is added to the water to clarify the same and render said water perfectly clear and without color.

A sufficient quantity of strong black liquid coffee is now added to the water to turn same a dark brown.

The casings are placed in the liquid and left to soak for approximately one hour, after which a sufficient amount of soap powder is added to the water to turn the same to a light brown color.

About one and one-half hours after the soap powder has been added to the bath the casings are taken out of the bath and manipulated or stripped through the hands in order to work the liquid thoroughly over all surfaces of the casings and to stretch the latter lengthwise and which latter action tends to prevent shrinkage of the casings.

After this hand manipulation, the casings are returned to the liquid and permitted to soak for another hour and a half and they are again manipulated and stripped and this operation is repeated at one and one half hour intervals up to five hours and which includes about four manual operations.

After the fourth manual manipulation and stripping the casings are taken from the bath and thoroughly washed in clean water and they are now ready for use or they may be salted down and packed for storage.

After the casings have been processed as just described, they will be found to be soft, pliable and with the desired degree of toughness to meet the requirements of the packers of chopped or ground meat products and further, the said casings have the desired light brown color. If white casings are desired the coffee is eliminated from the liquid solution.

The chemical elements within the iodine, ammonia and soap are effective in toughening the fibers of the casings and the soap imparts to the casings the desired degree of pliability and enables the casings to be readily slipped onto and off the horns of the casing filling machines.

The solution imparts no appreciable odor to the casings and the quantities of iodine, ammonia, coffee and soap powder used in the solution are insufficient to in any way affect the chopped or ground meat products that fill the casings.

In repeated tests, experiments and practice I have produced high grade casings that meet all demands of the packers and the market by treating said casings in a solution composed of one gallon of water, to which has been added approximately one teaspoonful of iodine, approximately one-fourth pint of aqua ammonia or five drops anhydrous ammonia, one pint strong black liquid coffee and two tablespoonfuls of soap powder.

These proportions of the ingredients added to the water may be varied slightly without appreciably affecting the desired high qualities of the treated casings.

Thus it will be seen that I have provided a relatively simple, economical and easily practiced method of treating sheep casings in order to toughen and color the same so that they will constitute a high grade marketable product that will meet all requirements of the producers and packers of chopped and ground meat products and the like.

I claim as my invention:

1. The herein described method of toughening sheep casings which consists in treating said casings with a solution composed of water to which has been added relatively small amounts of iodine, ammonia and soap.

2. The method of toughening sheep casings, which consists is treating the casings with a solution composed of water to which has been added relatively small quantities of iodine, ammonia, coffee and soap powder.

3. The herein described method of toughening sheep casings, which consists in soaking the casings in a solution composed of water, to which has been added relatively small amounts of iodine, ammonia, coffee and soap powder and periodically manipulating and stripping said casings.

4. The herein described method of toughening sheep casings, which consists in soaking the casings in a solution composed of water to which has been added relatively small amounts of iodine, ammonia and soap powder and manipulating and stripping said cases during the soaking period.

5. The herein described method of toughening sheep casings which consists in soaking the casings in a solution composed of water to which has been added iodine, ammonia and soap and manipulating said casings while the same are in the solution.

6. The herein described method of toughening sheep casings, which consists in soaking the casings in a solution composed of water to which has been added iodine, ammonia, liquid coffee and soap and manipulating and stripping said casings while the same are soaking in said solution.

In testimony whereof I affix my signature.

DANIEL E. WELTS.